3,427,195
ELECTRODE FOR ELECTROLYTIC CONDENSER AND PROCESS FOR PRODUCING THE SAME
Bernard F. G. Chesnot, Paris, France, assignor to Société anonyme: Les Condensateurs Sic-Safco, Colombes, Hauts-de-Seine, France, a French society
No Drawing. Filed Apr. 12, 1965, Ser. No. 447,538
Claims priority, application France, Apr. 20, 1964, 971,485
U.S. Cl. 117—200             14 Claims
Int. Cl. H01l 7/62; C23f 7/22

ABSTRACT OF THE DISCLOSURE

A process for the treatment of a metal foil to be used as an electrode in an electrolytic condenser whereby the entire surface thereof is covered with a thin adherent separator coating which permits the foil to be wound in direct contact with a second foil serving as the other electrode in a condenser and which comprises (1) coating the metal foil with a liquid film comprising a solution of water-soluble nitrate or oxalate salt of a metal, such nitrate or oxalate salt being decomposable by heat into an electrically insulating refractory oxide, which solution contains finely suspended particles of a water-insoluble electrically insulating refractory compound having a maximum particle size of 1 micron, (2) drying the film coating to remove the solvent therefrom, and (3) heating the dried coating to the pyrolysis temperature of the nitrate or oxalate salt to decompose it into an electrically insulating refractory oxide which together with the refractory compound form the separator coating on the electrode foil.

---

The present invention relates to an electrode for an electrolytic condenser and a process for producing the same.

Electrolytic condensers of aluminum or tantalum foil are at present wound with a porous paper separator inserted between the anode and cathode foils. However, omission of the separator paper has often been suggested in the literature in order to save space and to increase the specific capacity in the same volume of the completed condenser.

All attempts made in this direction have consisted in coating the cathode or anode with a fine adherent layer of thinner material than the separator paper. In this way, there is a saving in the total thickness of the winding strips and in the bulk of the paper omitted. However, the coating adhering to the metal foil plate must have a number of necessary properties, namely, sufficient permeability for the electrolyte so as not to increase the loss or power factor, sufficient thickness and tenacity to avoid any short circuit between the plates, sufficient adherence to the plate to eliminate flaking during the winding operation, adequate ionic purity to avoid corrosion during operation of the capacitor, insolubility and chemical stability in relation to the electrolyte, and aptitude for minimum decrease of the specified capacity of the etched plates.

In a general way, the separator attached to the plate is in the form of a more or less porous adherent film. Some technologists have suggested coating the aluminum foil by passing it through a bath containing a resinous binding material in solution, with or without a mineral charge, and then drying the foil by letting the solvent evaporate. A continuous coating film of desirable thickness is thus obtained, composed, for example, of phenol resin charged with chromium oxide and boric acid, or of nitrocellulose charged with titanium oxide, or of polyethylene in the form of fine globules separated by empty spaces. Unfortunately, in all of these processes using a resinous binder, it is difficult to obtain a coating sufficiently porous and conductive so as not to increase excessively the condenser loss factor. Above all, the specific capacity of the etched foils is so markedly decreased that their use is no longer of any advantage.

In another proposed process consisting of dusting the plate foil with a powder containing a fusible body, such as ammonium perborate, and a charge of alumina or silica, the film formed by subsequent fusion diminishes the etching of the foil or it does not resist the action of the electrolyte and the coating does not adhere firmly.

It has also been proposed that coating of the foil be effected by vacuum vaporization of silicon dioxide of silicates thereon. Here a difficulty was encountered in the obtention of coatings of sufficient thickness to prevent short circuits and also in the marked decrease in specific capacity of the etched foils.

Another proposed process which permits the obtention of porous and adherent films on the aluminum foil is anodic oxidation in a strong acid, such as oxalic acid or phosphoric acid. The first problem to be solved therein was the reduction of the thickness of the barrier film, which always forms under the porous layer, to a negligible value so as not to destroy the specific capacity of the etched foil used as a cathode. Progress appears to have been made in this direction by first forming in the cold to make the film porous and then at 70° C. to redissolve the barrier film. However, the porosity of the films thus formed is too low and the condensers obtained by this method have greater loss factors than the conventional models made with porous paper separators.

An object of the present invention is to provide a process permitting the obtention of an adherent separator film on an etched aluminum or tantalum foil used as a cathode with high specific capacity so that the coated cathode foil can be wound directly in contact with an anode foil without inserting a discrete separator to produce thereby an electrolytic capacitor with a specific capacity to volume exceeding that of condensers wound with a discrete paper or glass cloth separator.

The film obtained by the process of the invention on the etched foil used as a cathode is very adherent and can stand manipulation on conventional winders without difficulty. It is sufficiently thick to permit winding without any short circuiting of the largest electrolytic condensers. Furthermore its permeability is such that the loss factors of the condensers obtained are less than when the thinnest and most porous paper separators are used. The ionic purity of this new separator integral with the cathode is perfect and it is insoluble and acid-proof in all electrolytes in ordinary use. Finally, and this is an essential advantage, the process does not reduce the specific capacity of the etched cathode foil in any degrading manner, because, on the whole, smaller condensers can be produced with the same capacity as by making them with the same anode and the same cathode and a discrete paper separator.

A new and interesting property, particularly in the case of large condensers, is that the radial thermal conductivity of the windings obtained with the cathode of this invention is a multiple of that of the windings with a paper separator and permits better cooling. This advantage is considerable in using condensers with super-imposed alternating components. The process can be applied equally well to smooth foil or smooth wire as to etched ones. It can be used equally well for liquid impregnated condensers as for dry ones.

The important feature of the process of the invention is the pyrolysis of a component of the separator coating mixture deposited on the foil. The mixture is composed of two principal portions: (1) a water-soluble portion which is a metallic salt decomposable by heat at a temperature below the fusion temperature of the metal in the foil and producing by its decomposition a pure electrically insulating refractory oxide, and (2) a water-insoluble portion capable of a state of fine colloidal suspension, preferably in a thixotropic form, which is a refractory compound.

After pyrolysis, part 1 will supply from 25% to 75% by weight of the coating mass while part 2 will form from 75% to 25% by weight thereof. It has been found that the very finely divided water-insoluble part is distributed throughout the coating and serves as a base for crystallization of the electrically insulating refractory oxide formed by pyrolysis of the other or water-soluble part. The pyrolysis of the water-soluble salt releases acidic products which attack the metal of the foil and thereby facilitate adherence of the mixture thereto. However, it was further found that the use alone of the water-soluble salt capable of pyrolysis yielded coatings which were not adherent and that the presence of the water-insoluble refractory compound in fine suspension is essential for the perfect adherence of the coating during the winding of the condenser and for avoidance of short circuits.

Suitable salts soluble in water and decomposable into electrically insulating refractory oxides through heating, generally at from about 400° C. to about 600° C., include, for example, ferric oxalate and ferric ammonium oxalate. The preferred water-soluble salt is aluminum nitrate.

Suitable water-insoluble refractory compounds include oxides and salts such as silica, alumina, titanium dioxide, magnesium oxide, zinc oxide, zirconium dioxide, aluminum phosphate, talc and kaolin. These materials must be used in a very finely divided state and hence they have a maximum particle size of 1 micron and preferably a particle size from about 10 to about 100 millimicrons. Larger particles cannot be used, because they separate out from the coating solution, give irregular coatings, produce non-adherent coating or cause other defects. The preferred water-insoluble refractory compound is colloidal silica.

In forming the finished coating by pyrolysis, it is possible that there may be a reaction of the two oxides, such as the silica and the alumina initially formed by pyrolysis of aluminum nitrate, at the time the pyrolyzable water-soluble salt passes through its hydrous phases. This would explain the good mechanical properties of the separator coating obtained. (It is better to select the two oxides so as they may chemically react to give a stable combination or addition compound.)

Further details of the process and products of the invention are set forth below.

In the process according to the invention, the aluminum foil passes, at room temperature and at a constant rate of 20 meters an hour, through an agitated bath composed of the following exemplary elements:

| | | |
|---|---|---|
| Water | liter | 1 |
| Aluminum nitrate | kg | 0.50 |
| Colloidal silica (10–100 millimicrons) | kg | 0.08 |
| Phosphoric acid | kg | 0.002 |

After its passage through the bath, the strip of foil is dried in the atmosphere and then heated to 500° C. for one minute. The coating, drying and pyrolysis treatment is repeated at least two times in order to obtain a sufficient thickness of the separator coating on the foil. After the last heating at 500° C. it is washed in mineral-free water and dried in the atmosphere. The aluminum foil thus treated is ready for use. It was noted that, in order to prevent short circuits in the direct winding of this strip with an anode for making the capacitor, the coating on each surface of the aluminum foil had to be at least 10 microns thick.

With the above described treatment, this thickness is attained with a weight of 1.4 mg./cm.$^2$ of area on both sides of foil. The separator coating obtained is white and of granulated appearance. It adheres very well because the foil can be bent at a radius of 2 mm. without being subject to flaking.

The adherence mechanism is explained by the fact that, in the course of pyrolysis, the acidic nitrogen oxide liberated from the aluminum nitrate attacks the surface of the metal foil at the very place where the alumina derived from the decomposition of the aluminum nitrate is formed and where the colloidal silica is deposited, the latter serving a base for crystallization of the alumina. However, as has already been mentioned above, it was observed that the use of aluminum nitrate alone does not provide such adherent coatings, because they chip when bending is attempted and they are not resistant to abrasion or the action of a water spray.

The porosity of the coating is very good because the capillary ascent of water is 6 mm. and absorption of glycol is easy. It is believed that this porosity is due to the presence of very numerous little craters caused by the release of gas in the course of pyrolysis and also to a very fine network of small cracks which are produced in the course of thermal shock on the foil and in the course of drying.

The treatment temperature most favorable for the above exemplary mixture is 500° C. to 550° C. The required duration of pyrolysis is about 1 minute. With the above formula, the composition of the final integral separator coating is approximately 55% silica and 45% alumina by weight.

The small quantity of phosphoric acid indicated in the above formula is utilized to prevent the action of the boiling water on the aluminum cathode in the course of drying. Solvents other than water, such as alcohol and acetone, could be employed. Control of the thickness of the separator coating is effected by subjecting the foil to several successive cycles of moistening, drying and pyrolysis (or by varying the rate at which the foil passes through each solution). It is not necessary to wash the foil each time in demineralized water between each cycle, but just once after the last pyrolysis.

According to the invention another bath to pass the aluminum foil through can be composed of the following exemplary elements:

| | | |
|---|---|---|
| Water | liters | 1 |
| Ferricammonium oxalate | kg | 0.500 |
| Colloidal silica (10–100 millimicrons) | kg | 0.075 |
| Phosphoric acid | kg | 0.002 |

The conditions of the passage of the foil through the bath, of pyrolysis and the number of pyrolysis treatments are identical. The separator coating obtained is brown and soft. It adheres very well and the foil can be bent at a radius of 2 mm. without flaking. The adherence mechanism is the same as for alumina and silica. However the capillarity ascent of water is greater, i.e., 14 mm. and absorption of glycol is easy. The composition of the final coating in this case is approximately 55% ferric oxide and 45% silica by weight.

The formation of the coating on an etched aluminum foil to be used as a cathode is not without effect on the specific capacity of the latter. For example, with a cathode 40 microns thick, the specific capacity which was 35 $\mu$f./cm.$^2$ prior to coating drops to 20 $\mu$f./cm.$^2$ after coating. With a cathode of 100 $\mu$f./cm.$^2$, the specific capacity after coating is not above 35 $\mu$f./cm.$^2$. However, in spite of this decrease, a very appreciable advantage in volume of the completed condenser is obtained in relation to a condenser made with the same anode and cathode but with inclusion of a discrete paper separator. Indeed, elimination of the paper strips affords an appreciable advantage as regards volume and permits including greater length of anode and cathode strips in the same size condenser case.

Usually when paper is used, a winding is produced with the following thicknesses: 80 micron anode+50 micron paper+40 micron cathode+50 micron paper, that is a total of 220 microns. With cathode foil coating according to the method in the invention a winding is produced with 80 micron anode+40 micron cathode+2 x 15 micron coating, that is a total of 150 micron thickness. This permits the utilization of 40% extra length of foil string in the same size condenser can. The examples of condensers given below will provide a better understanding of this gain.

Example 1

With an etched cathode of 100 μf./cm.² specific capacity and an anode giving 10 μf./cm.² the resulting capacity is $$\frac{10 \times 100}{110} = 9 \ \mu f./cm.^2$$

and if a paper separator is used with foil strips 1 cm. wide and 11 cm. long, a condenser of 100 μf. is produced. With the same cathode coated according to the process of the invention and hence having a specific capacity not above 34 μf./cm.² and the same anode of 10 μf./cm.² the resulting capacity is not more than $$\frac{10 \times 35}{4} = 7.8 \ \mu f./cm.^2$$

However, it is possible to wind, in the same volume, 14.3 cm. long foil strips 1 cm. wide and thereby make a condenser $7.8 \times 14.3 = 112$ μf.

Example 2

An electrolytic condenser of 1500 μf. can be made with an anode with 4 μf./cm.² specific capacity, a paper separator strip 4 cm. wide and 1 mm. long and a 100 μf./cm.² cathode. In the same size condenser case with an anode of 4 μf./cm.² specific capacity and 4 cm. wide, wound with the cathode treated according to the invention having 35 μf./cm.² specific capacity, a condenser of 2000 μf. will be produced.

Example 3

A miniature electrolytic condenser of 115 μf. 16 v. is made in a case with a diameter of 9.5 mm. and a length of 26 mm. In the same case a 160 μf. 16 v. condenser is obtained with the same anode foil and cathode foil but the latter being treated according to the process of the invention.

Example 4

In applying the same process to a condenser 4500 μf./20–30 v., the dimensions of the case, which were 36 mm. in diameter and 89 mm. in height, can be reduced to a diameter of 36 mm. and a height of only 4.9 mm.

The performance of the condensers of the invention after testing are very good as regards longevity and retention of characteristics. Condensers according to Example 3 with 160 μf./16–20 v. underwent a longevity test of 1000 hours at 85° C. and after the test they showed a loss factor of 0.04 at 20° C. and an impedance ratio of $$\frac{Z - 40°\ C.}{Z + 20°\ C.} = 1.7$$

at 100 cycles.

Condensers are made with a cathode foil coated according to the process of the invention by winding the cathode foil in direct contact with the anode foil. A connecting tab is attached to the cathode foil in the usual way and protrudes from the winding. The connecting tab may also be welded to the cathode after removal of the separator coating by local phospho-chromic mixture treatment. A connecting tab is also fixed to the anode. The width of the cathode is greater than that of the anode and this width is chosen equal to that of the paper separator used in a conventional condenser, that is the cathode foil is between 1 and 5 mm. wider than the anode foil. The remainder of the condenser structure conforms to conventional practice.

Although it is more advantageous for the gain in volume of the condensers to apply the coating on the cathode, the process of the invention is also applicable to the anode before or after anodic formation of the dielectric film.

What is claimed is:

1. A process for the treatment of a metal foil used as an electrode in an electrolytic condenser to cover its entire surface with a thin adherent separator coating which permits winding the foil in direct contact with a second foil serving as the other electrode in the condenser comprising:
   (1) coating the metal foil with a liquid film comprising a solution of a water-soluble metallic salt selected from the group consisting of nitrates and oxalates, such salt being decomposable by heat into an electrically insulating refractory oxide, which solution contains finely suspended particles of a water-insoluble refractory compound having a maximum particle size of 1 micron;
   (2) drying the film coating to remove the solvent therefrom; and
   (3) heating the dried coating to the pyrolysis temperature of the metallic salt to decompose it into an electrically insulating refractory oxide which together with the refractory compound forms the separator coating on the electrode foil.

2. The process for the treatment of an aluminum foil used as a cathode in an electrolytic condenser to cover its entire surface with a thin adherent separator coating which permits winding the foil in direct contact with a second aluminum foil serving as the anode in the condenser comprising (1) coating the aluminum foil with a liquid film comprising an aqueous solution of a water-soluble metallic salt decomposable by heat into an electrically insulating refractory oxide selected from the group consisting of aluminum nitrate, ferric oxalate and ferric ammonium oxalate, which solution also contains finely suspended particles of a water-insoluble refractory compound selected from the group consisting of silica, alumina, titanium dioxide, magnesium oxide, zinc oxide, zirconium dioxide, aluminum phosphate, talc and kaolin having a maximum particle size of 1 micron, (2) drying the film coating to remove the aqueous solvent therefrom and (3) heating the dried coating to the pyrolysis temperature of the metallic salt to decompose it into an electrically insulating refractory oxide which together with the refractory compound forms the separator coating on the aluminum cathode foil, said separator coating containing from about 25% to about 75% by weight of the formed refractory oxide and from about 75% to about 25% by weight of the finely divided refractory compound.

3. The process as set forth in claim 2 wherein the coating, drying and pyrolyzing steps are repeated several times in succession to increase the thickness of the separator coating.

4. The process as set forth in claim 3 wherein the coated foil is washed in mineral-free water after the last pyrolysis step.

5. The process for the treatment of an aluminum foil used as a cathode in an electrolytic condenser to cover its entire surface with a thin adherent separator coating which permits winding the foil in direct contact with a second aluminum foil serving as the anode in the condenser comprising (1) coating the aluminum foil with a liquid film comprising an aqueous solution of aluminum nitrate in a concentration of about 500 grams of aluminum nitrate per liter of water, which solution also contains finely suspended silica particles having a size from about 10 to about 100 millimicrons in a concentration of about 80 grams of silica per liter of water, (2) drying the film coating to remove the aqueous solvent therefrom and (3)

heating the dried coating at a pyrolysis temperature of from about 400° C. to about 600° C. for about 1 minute to decompose the aluminum nitrate into alumina which together with the silica forms the separator coating on the aluminum cathode foil, said separator coating containing about 45% by weight of alumina and about 55% by weight of silica.

6. The process as set forth in claim 5 wherein the coating, drying and pyrolyzing steps are repeated several times in succession to increase the thickness of the separator coating to at least 10 microns and the weight thereof to about 1.4 milligrams per square centimeter of area on both sides of foil.

7. The process as set forth in claim 6 wherein the coated foil is washed in mineral-free water after the last pyrolysis step.

8. The process for the treatment of an aluminum foil used as a cathode in an electrolytic condenser to cover its entire surface with a thin adherent separator coating which permits winding the foil in direct contact with a second aluminum foil serving as the anode in the condenser comprising (1) coating the aluminum foil with a liquid film comprising an aqueous solution of ferric ammonium oxalate in a concentration of about 500 grams of ferric ammonium oxalate per liter of water, which solution also contains finely suspended silica particles having a size from about 10 to about 100 millimicrons in a concentration of about 75 grams of silica per liter of water, (2) drying the film coating to remove the aqueous solvent therefrom and (3) heating the dried coating at a pyrolysis temperature of from about 400° C. to about 600° C. for about 1 minute to decompose the ferric ammonium oxalate into ferric oxide which together with the silica forms the separator coating on the aluminum cathode foil, said separator coating containing about 55% by weight of ferric oxide and about 45% by weight of silica.

9. The process as set forth in claim 8 wherein the coating, drying and pyrolyzing steps are repeated several times in succession to increase the thickness of the separator coating to at least 10 microns and the weight thereof to about 1.4 milligrams per square centimeter of area on both sides of foil.

10. The process as set forth in claim 9 wherein the coated foil is washed in mineral-free water after the last pyrolysis step.

11. An electrode foil having a thin adherent separator coating composed of an electrically insulating refractory oxide formed from the reaction of a solution of water-soluble metallic salts selected from the group consisting of aluminum nitrate, ferric oxalate and ferric ammonium oxalate containing finely suspended particles of a water-insoluble refractory compound having a maximum size of 1 micron, said solution having been first applied to said foil, subjected to drying and then heated.

12. The electrode foil of claim 11 wherein the water-insoluble refractory compound suspended in said solution is selected from the group consisting of silica, alumina, titanium dioxide, magnesium oxide, zinc oxide, zirconium dioxide, aluminum phosphate, talc and kaolin, and said formed separator coating contains from about 25% to about 75% by weight of the formed refractory oxide and from about 75% to about 25% by weight of the finely divided refractory compound.

13. The electrode foil of claim 11 wherein the separator coating on said foil is formed from an aqueous solution of aluminum nitrate in a concentration of about 500 grams of aluminum nitrate per liter of water, which solution also contains finely suspended silica particles having a size from about 10 to about 100 millimicrons in a concentration of about 80 grams of silica per liter of water which after drying is subjected to a temperature of from about 400° C. to about 600° C. for about 1 minute to form a separator coating containing about 45% by weight of alumina and about 55% by weight of silica.

14. The electrode foil of claim 11 wherein the separator coating on said foil is formed from an aqueous solution of ferric ammonium oxalate in a concentration of about 500 grams of ferric ammonium oxalate per liter of water, which solution also contains finely suspended silica particles having a size from about 10 to about 100 millimicrons in a concentration of about 75 grams of silica per liter of water which after drying is subjected to a temperature of from about 400° C. to about 600° C. for about 1 minute to form a separator coating containing about 55% by weight of ferric oxide and about 45% by weight of silica.

References Cited

UNITED STATES PATENTS 2,722,491 11/1955 Anderson _____ 117—231

WILLIAM L. JARVIS, *Primary Examiner.*

U.S. Cl. X.R.

117—221, 231, 222; 317—234, 238